United States Patent
Kim et al.

(10) Patent No.: US 10,604,679 B2
(45) Date of Patent: Mar. 31, 2020

(54) HIGH PERFORMANCE SKI WAX COMPOSITION AND PREPARATION METHOD THEREOF

(71) Applicant: SEOUL NATIONAL UNIVERSITY R&DB FOUNDATION, Seoul (KR)

(72) Inventors: Ho-Young Kim, Seoul (KR); Changho Yun, Daejeon (KR); Dongjo Kim, Seoul (KR)

(73) Assignee: SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 0 days.

(21) Appl. No.: 15/774,220

(22) PCT Filed: Apr. 19, 2017

(86) PCT No.: PCT/KR2017/004202
§ 371 (c)(1),
(2) Date: May 7, 2018

(87) PCT Pub. No.: WO2018/182087
PCT Pub. Date: Oct. 4, 2018

(65) Prior Publication Data
US 2019/0106598 A1    Apr. 11, 2019

(30) Foreign Application Priority Data
Mar. 29, 2017    (KR) .................. 10-2017-0039870

(51) Int. Cl.
| | |
|---|---|
| *C09G 3/00* | (2006.01) |
| *C01B 32/15* | (2017.01) |
| *A63C 11/04* | (2006.01) |
| *C09G 1/08* | (2006.01) |
| *B82Y 40/00* | (2011.01) |
| *B82Y 30/00* | (2011.01) |

(52) U.S. Cl.
CPC ............... *C09G 3/00* (2013.01); *A63C 11/04* (2013.01); *C01B 32/15* (2017.08); *C09G 1/08* (2013.01); *B82Y 30/00* (2013.01); *B82Y 40/00* (2013.01); *C01P 2004/64* (2013.01); *C01P 2006/90* (2013.01)

(58) Field of Classification Search
CPC ...................................................... C09G 3/00
See application file for complete search history.

(56) References Cited

U.S. PATENT DOCUMENTS 6,465,398 B1    10/2002    Arnold

FOREIGN PATENT DOCUMENTS

| | | |
|---|---|---|
| DE | 102011116342 B3 * | 3/2013 |
| DE | 102011116342 B3 | 3/2013 |
| EP | 2292704 B1 | 8/2013 |
| JP | 2010-024358 A | 2/2010 |
| JP | 5026659 B2 | 6/2012 |
| JP | 2013-117016 A | 6/2013 |

OTHER PUBLICATIONS

Nanocarbon Superhydrophobic Surfaces Created from Fullerene-based Hierarchical Supramolecular Assemblies Takashi Nakanishi et al Adv. Mater. v20 pp. 443-446 (Year: 2008).*
Machine translation of DE102011116342B3 Downloaded May 17, 2019 (Year: 2013).*
International Search Report in International Application No. PCT/KR2017/004202, filed Apr. 19, 2017.
Meng, L. et al., Superhydrophobic carbon-based materials: a review of synthesis, structure, and applications, Carbon Letters, 2014, 15(2):89-104, Korean Carbon Society.
Dai, W. et al., Porous Carbon Nanoparticle Networks with Tunable Absorbability, Scientific Reports, Aug. 28, 2013, 3:1-8.

* cited by examiner

*Primary Examiner* — Douglas B Call
(74) *Attorney, Agent, or Firm* — Saliwanchik, Lloyd & Eisenschenk

(57) ABSTRACT

The present disclosure relates to a ski wax composition including superhydrophobic carbon nano particles (CNPs) and a preparation method thereof, and more particularly, to a ski wax composition including a wax and superhydrophobic CNPs and a preparation method thereof. According to the present invention, since the hydrophobicity and retention capacity of the wax can be increased, friction reducing performance of a ski wax can be increased on an ice surface or a snow surface. In addition, since the superhydrophobic CNPs, which can be easily prepared, are used, the productivity of the ski wax composition can be improved and superb friction reducing performance can be exhibited. Further, since the superhydrophobic CNPs are dispersed into the wax by a simple sonication process, a problem caused by adding a surfactant can be solved. Therefore, the ski wax composition according to the present disclosure can be widely applied to industrial fields associated with the winter sports, including skiing.

10 Claims, 4 Drawing Sheets

Alkane (Main ingredient of wax)

Fluoroalkane (Wax additive)

Paraffin Wax + DLC nano particles

AFM image of Paraffin wax     AFM image of (Paraffin wax + CNP)

HIGH PERFORMANCE SKI WAX COMPOSITION AND PREPARATION METHOD THEREOF

CROSS-REFERENCE TO RELATED APPLICATIONS

This application is the U.S. national stage application of International Patent Application No. PCT/KR2017/004202, filed Apr. 19, 2017, which claims priority to Korean Application No. 10-2017-0039870, filed Mar. 29, 2017, the disclosures of each of which are incorporated herein by reference in their entirety.

BACKGROUND

Technical Field

The present disclosure relates to a ski wax composition including superhydrophobic carbon nano particles (CNPs) and a preparation method thereof. More particularly, the present disclosure relates to a ski wax composition including a wax and superhydrophobic CNPs and a preparation method thereof.

Description of the Related Art

Skiing is one of representative winter sports and is becoming more and more common all over the world, and the number of people enjoying skiing is on a dramatically increasing trend. In order to increase a running speed in skiing by reducing a frictional force on an ice surface or a snow surface, ski waxes are used. To reduce friction on the ice or snow surface, ski waxes have been developed to have hydrophobicity. It is known that the higher the surface roughness, the greater the hydrophobicity and the lower the frictional forces on the ice or snow surface.

Methods of preparing ski waxes having increased hydrophobicity by mixing a fluorine resin, such as polytetrafluoroethylene (PTFE), molybdenum disulphide, gallium, indium, titanium oxide, and carbon nanoparticles, such as fullerene or diamond nano particles, have been used (Japanese Laid-Open Publication No. 2013-117016). However, it is relatively difficult to produce fullerene or diamond nano particles, and undesired particle agglomeration may occur, making it difficult to disperse the particles into a wax. Thus, a separate surfactant, such as isopropyl alcohol, should be inevitably added. However, hydrophobicity of a wax surface may decrease due to the added surfactant, resulting in degradation of the overall performance.

Accordingly, the present inventors have made extensive efforts to develop a ski wax composition having maximized hydrophobicity to provide superb friction reducing performance and having increased productivity, and as a result, have found that the productivity can be improved and noticeably excellent friction reducing performance is exhibited when superhydrophobic CNPs are added, thereby completing the present disclosure.

SUMMARY

Problems to be Solved

It is an object of the present disclosure to provide a ski wax composition including a wax and superhydrophobic carbon nano particles (CNPs).

It is another object of the present disclosure to provide a preparation of a ski wax composition including (a) adding superhydrophobic CNPs to a wax, and (b) performing sonication.

Means to Solve the Problems

In accordance with an aspect of the present disclosure, the above and other objects can be accomplished by providing a ski wax composition including a wax and superhydrophobic carbon nano particles (CNPs).

In addition, in accordance with another aspect of the present disclosure, the above and other objects can be accomplished by providing a preparation of a ski wax composition including (a) adding superhydrophobic CNPs to a wax, and (b) performing sonication.

Effects of the Present Disclosure

As described above, according to the ski wax composition including superhydrophobic CNPs of the present disclosure, and the preparation method thereof, the hydrophobicity and retention capacity of the wax can be increased, thereby maximizing friction reducing performance of a ski wax on an ice surface or a snow surface. In addition, since the superhydrophobic CNPs, which can be easily prepared, are used, the productivity of the ski wax composition can be improved and superb friction reducing performance can be exhibited. Further, since the superhydrophobic CNPs are dispersed into the wax by a simple sonication process, a problem caused by adding a surfactant can be solved. Therefore, the ski wax composition according to the present disclosure can be widely applied to industrial fields associated with the winter sports, including skiing.

BEST MODE FOR CARRYING OUT THE PRESENT DISCLOSURE

Unless defined otherwise, all technical and scientific terms used herein have the same meaning as commonly understood by one of ordinary skill in the art. Generally, the nomenclature used herein is method well known and commonly employed in the art.

Figure 1:
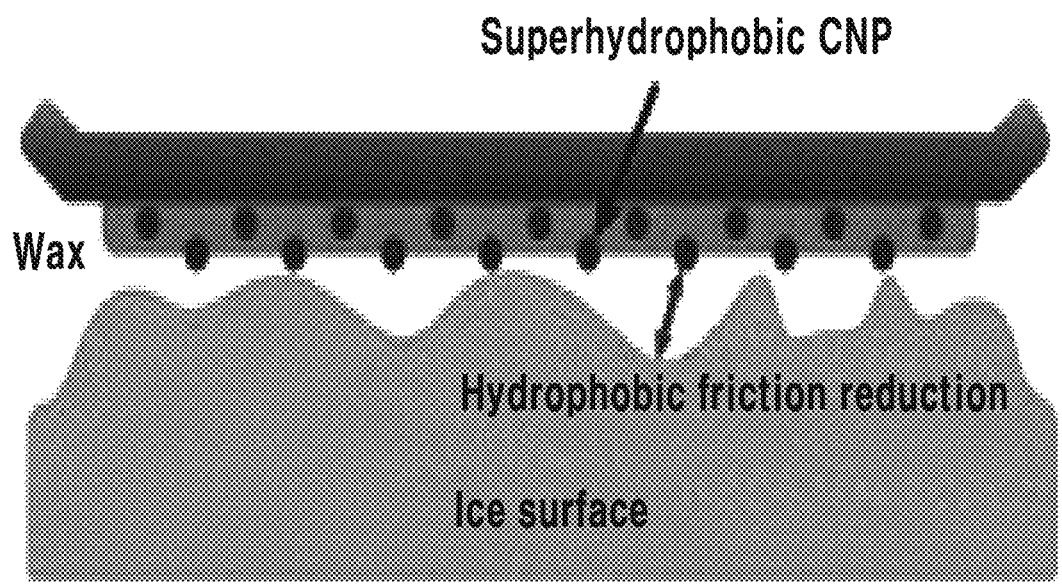
FIG. 1 schematically illustrates friction reducing performance of ski wax composition according to the present disclosure.

The present disclosure relates a ski wax composition, and a preparation method thereof, which can improve the hydrophobicity and retention capacity of the wax can be increased by adding superhydrophobic CNPs to the wax, thereby maximizing friction reducing performance of a ski wax on an ice surface or a snow surface (FIG. 1).

The "superhydrophobic carbon nano particles" used herein specifically refer to carbon or hydrocarbon particles having superhydrophobicity. The superhydrophobic carbon nano particles are preferably diamond like carbon (DLC) nano particles, which may be prepared by glow discharging $C_2H_2$ under a high pressure. The DLC nano particles have a diameter in the range of 30 to 50 nm and a contact angle of approximately 128° (Dai, Wei, et al., "Porous carbon nanoparticle networks with tunable absorbability", Scientific reports 3 (2013): 2524).

In one aspect, the present disclosure relates to a ski wax composition including a wax and superhydrophobic carbon nano particles (CNPs) (DLC nano particles).

In the present disclosure, the ski wax composition may further include a wax additive.

In the present disclosure, the superhydrophobic CNPs are contained in the ski wax composition preferably in an amount of 0.5 to 10% by weight, more preferably in an amount of 2.5% by weight. If the amount of the superhydrophobic CNPs is less than 0.5% by weight, a friction reducing effect is negligibly low. If the amount of the superhydrophobic CNPs is greater than 10% by weight, a noticeable change in the friction reducing effect is not exhibited, suggesting that the cost effectiveness is lowered.

Figure 2:
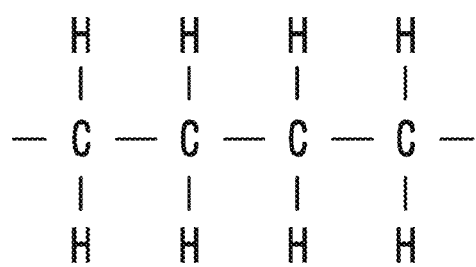
FIG. 2 illustrates structures of a wax and a wax additive included in the ski wax composition according to the present disclosure.
Figure 2:
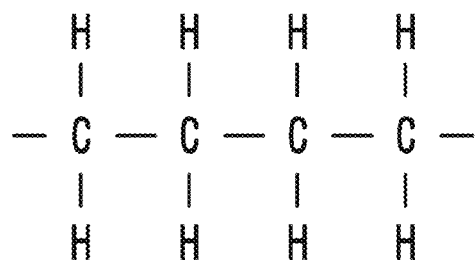

In the present disclosure, the wax may be alkane in a solid phase at room temperature, preferably C20-C60 alkane, and the wax additive may be fluoroalkane or perfluoroalkane, but not limited thereto (FIG. 2).

In another aspect, the present disclosure relates to a preparation method of a ski wax composition comprising the steps of (a) adding superhydrophobic CNPs to a wax, and (b) performing sonication.

In the present disclosure, the step (a) may further include adding a wax additive.

In the present disclosure, the step (a) may include adding 0.5 to 10%, more preferably 2.5%, by weight of the superhydrophobic CNPs. If the amount of the superhydrophobic CNPs is less than 0.5% by weight, a friction reducing effect is negligibly low. If the amount of the superhydrophobic CNPs is greater than 10% by weight, a noticeable change in the friction reducing effect is not exhibited, suggesting that the cost effectiveness is lowered.

In the present disclosure, the wax in the step (a) may be alkane in a solid phase at room temperature, preferably C20-C60 alkane, and the wax additive in the step (a) may be fluoroalkane or perfluoroalkane (FIG. 2).

EXAMPLES

Hereinafter, the present disclosure will be described in further detail with reference to examples. It will be obvious to a person having ordinary skill in the art that these examples are illustrative purposes only and are not to be construed to limit the scope of the present disclosure. Thus, the substantial scope of the present disclosure will be defined by the appended claims and equivalents thereof.

Example 1: Preparation of Ski Wax Composition

A ski wax composition was prepared by adding 0.5 to 10% by weight of DLC nano particles (Dai, Wei, et al., "Porous carbon nanoparticle networks with tunable absorbability", Scientific reports 3 (2013): 2524) using a common wax (Racing mix wet, Holmenkol) as a base.

The common wax and the DLC nano particles were together transferred to a vessel and then hermetically sealed. Thereafter, the wax was heated in a water bath or melted in an oven maintained at a temperature of 120° C. to allow the DLC nano particles to be soaked into the wax. Then, boiled water was put into a sonicator, and the wax was taken out from the water bath or the oven to then be immediately transferred to the sonicator, followed by performing sonication for one minute. According to the kind of common wax used, the cycle of heating the wax in the water bath or the melting the wax in the oven and performing sonication was repeated once or twice. After cooling, the resultant product was taken out from the vessel, thereby completing the ski wax composition.

Example 2: Analysis of Friction Reducing Performance of Ski Wax Composition

In order to confirm the friction reducing effect of the ski wax composition prepared in Example 1, two kinds of common waxes (i.e., Main Wax HF manufactured by Vola and Racing Mix Wet manufactured by Holmenkol) and the ski wax composition prepared in Example 1 (i.e., Wax+CNP) were compared and analyzed in terms of friction reducing performance.

Figure 3:
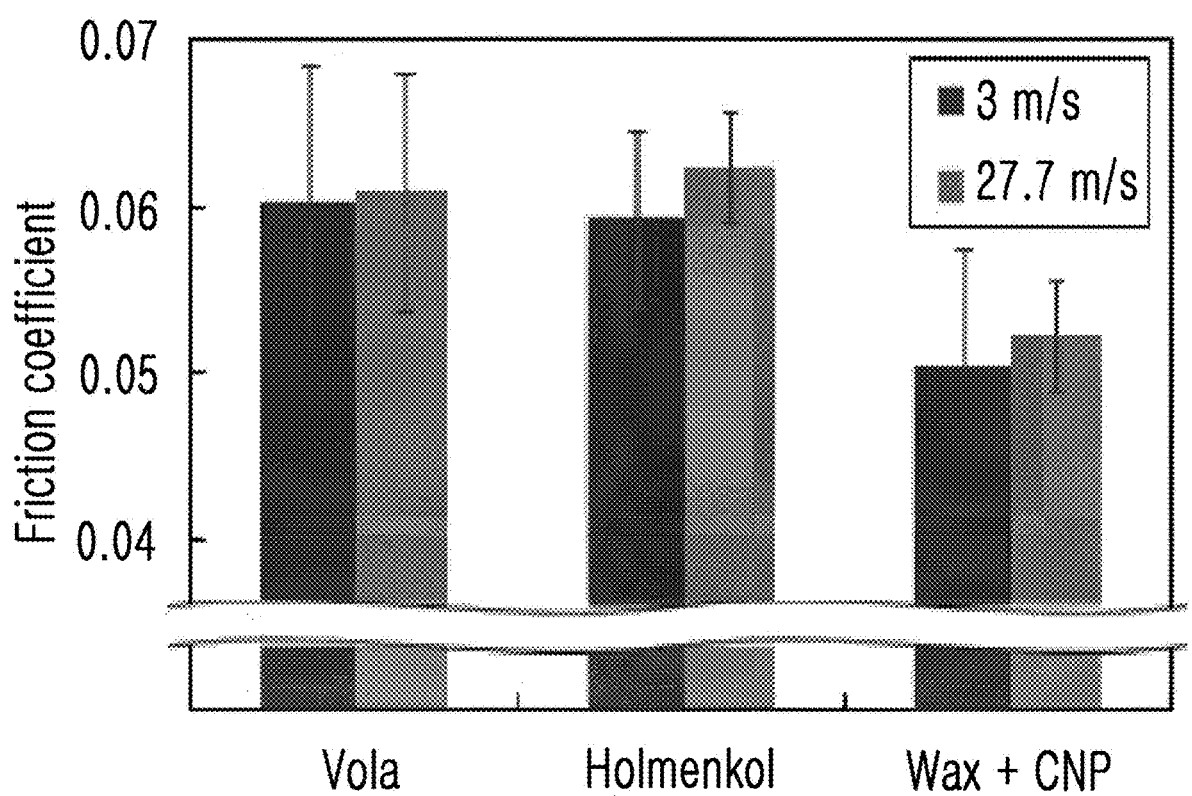
FIG. 3 is a graphical representation for comparison of friction reducing performance of a ski wax composition according to the present disclosure and common waxes.
Figure 4:
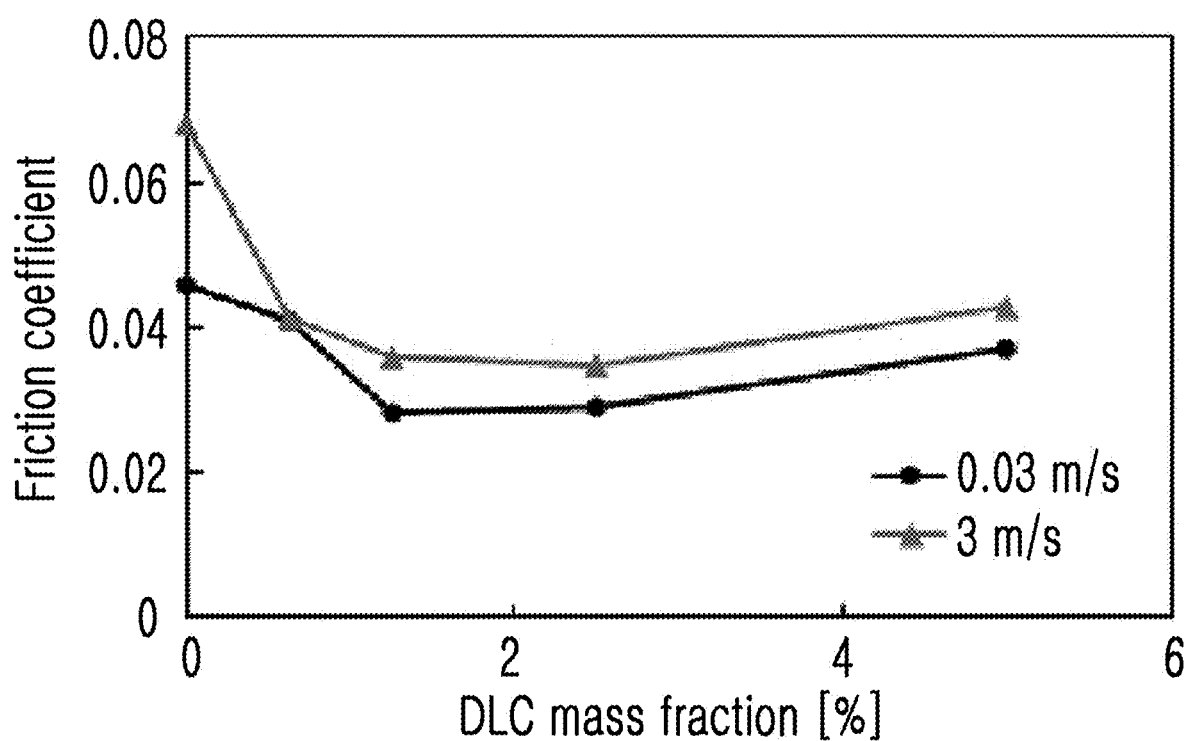
FIG. 4 illustrates friction reducing performance depending on mass fraction of added DLC nano particles.

Friction coefficients were measured using a rotary type friction tester (Micro Fluid Mechanics Laboratory, Seoul National University), and as a result, it was confirmed that the ski wax composition prepared in Example 1 (Wax+CNP), which contained DLC nano particles added in an amount of 5% by weight, showed an approximately 20% reduction in the friction coefficient, compared to the common waxes (FIG. 3). In addition, the friction coefficients depending on the DLC mass fraction (%) were measured. The measurement result was confirmed that the highest friction reducing effect was demonstrated when the DLC mass fraction was 2.5% (FIG. 4).

Figure 5:
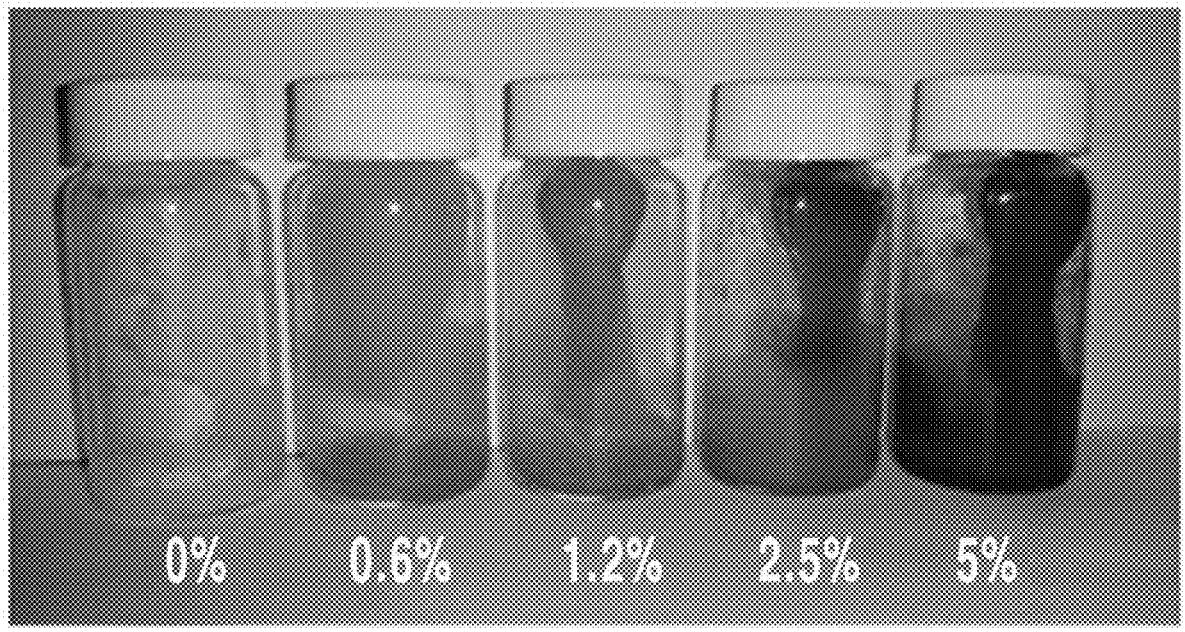
FIG. 5 is a photograph showing paraffin waxes with DLC nano particles added thereto in various amounts.
Figure 6:
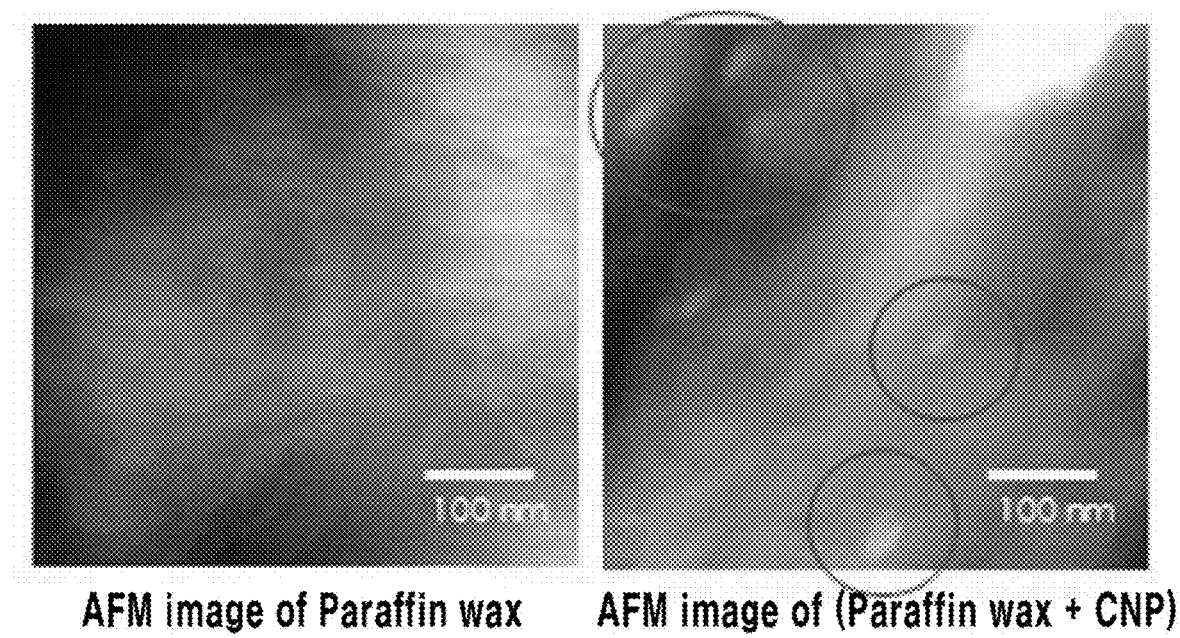
FIG. 6 illustrates AFM images of a common wax and a ski wax composition of the present disclosure.

In addition, DLC nano particles in amounts of 0.6%, 1.2%, 2.5% and 5% by weight were added to paraffin waxes in the same manner as in Example 1, and appearances of the mixtures were observed (FIG. 5). Additionally, DLC nano particles in amounts of 5% by weight were added to paraffin waxes in the same manner as in Example 1, and the resultant product was photographed by atomic force microscopy (AFM). As a result, unlike the common waxes, it was confirmed that the resultant product had CNPs protruding on its surface to have increased hydrophobicity (FIG. 6).

Consequently, it was conformed that the CNPs exposed on the surface of the ski wax composition made adhesion with respect to the ice surface decreased, and rendered friction reducing performance.

Although the present disclosure has been described in detail with reference to the specific features, it will be apparent to those skilled in the art that this description is only for a preferred embodiment and does not limit the scope of the present disclosure. Thus, the substantial scope of the present disclosure will be defined by the appended claims and equivalents thereof.

What is claimed is:

1. A ski wax composition comprising:
   a wax; and
   diamond like carbon nano particles.

2. The ski wax composition of claim 1, further comprising a wax additive.

3. The ski wax composition of claim 2, wherein the wax additive is fluoroalkane or perfluoroalkane.

4. The ski wax composition of claim 1, wherein the diamond like carbon nano particles are contained in an amount of from 0.5% to 10% by weight, based on the total weight of the composition.

5. The ski wax composition of claim 1, wherein the wax is an alkane in a solid phase at room temperature.

6. A preparation method of a ski wax composition comprising:
 (a) adding diamond like carbon nano particles to a wax; and
 (b) performing sonication.

7. The preparation method of claim 6, wherein (a) further comprises adding a wax additive.

8. The preparation method of claim 7, wherein in (a), the wax additive is fluoroalkane or perfluoroalkane.

9. The preparation method of claim 6, wherein (a) comprises adding 0.5% to 10% by weight of the diamond like carbon nano particles, based on the total weight of the composition.

10. The preparation method of claim 6, wherein in (a), the wax is an alkane in a solid phase at room temperature.

\* \* \* \* \*

UNITED STATES PATENT AND TRADEMARK OFFICE
CERTIFICATE OF CORRECTION

Page 1 of 1

PATENT NO. : 10,604,679 B2
APPLICATION NO. : 15/774220
DATED : March 31, 2020
INVENTOR(S) : Ho-Young Kim, Changho Yun and Dongjo Kim It is certified that error appears in the above-identified patent and that said Letters Patent is hereby corrected as shown below:

In the Drawings

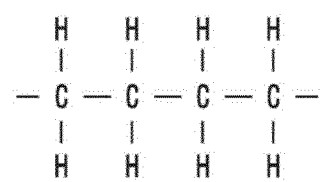
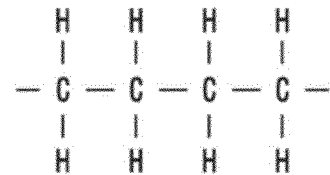
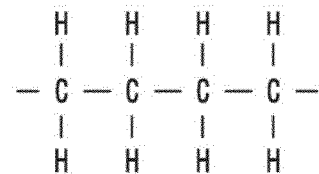
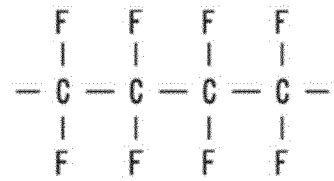

Sheet 1, Figure 2, " " should read -- --.

Signed and Sealed this
Thirtieth Day of June, 2020

Andrei Iancu
*Director of the United States Patent and Trademark Office*